United States Patent [19]

Douzono et al.

[11] Patent Number: 5,574,983
[45] Date of Patent: Nov. 12, 1996

[54] BASE STATION DEVICE AND MOBILE STATION DEVICE IN MOBILE COMMUNICATION SYSTEM UTILIZING THE SITE DIVERSITY EFFECT IN SOFT HANDOVER STATE

[75] Inventors: Youichi Douzono, Dazaihu; Narumi Umeda, Yokohama, both of Japan

[73] Assignee: NTT Mobile Communications Network Inc., Tokyo, Japan

[21] Appl. No.: 314,719

[22] Filed: Sep. 29, 1994

[30] Foreign Application Priority Data

Sep. 29, 1993 [JP] Japan .................. 5-242735

[51] Int. Cl.⁶ .................................. H04B 1/00
[52] U.S. Cl. ................ 455/69; 455/33.2; 455/54.1; 455/56.1; 455/70; 379/60
[58] Field of Search ............... 455/69, 70, 38.3, 455/53.2, 53.1, 54.1, 56.1, 54.2, 67.1, 67.3; 379/59, 60

[56] References Cited

U.S. PATENT DOCUMENTS

| | | | |
|---|---|---|---|
| 4,613,990 | 9/1986 | Halpern | 455/33.1 |
| 4,765,753 | 4/1988 | Schmidt | 379/60 |
| 5,260,943 | 11/1993 | Comroe et al. | 370/95.1 |
| 5,265,119 | 11/1993 | Gilhousen et al. | 375/1 |
| 5,369,786 | 11/1994 | Hulsebosch | 455/70 |
| 5,386,588 | 1/1995 | Yasuda | 455/33.1 |

FOREIGN PATENT DOCUMENTS

| | | |
|---|---|---|
| 0160993 | 11/1985 | European Pat. Off. . |
| 0241954 | 10/1987 | European Pat. Off. . |
| 0330166 | 8/1989 | European Pat. Off. . |
| 0548939 | 6/1993 | European Pat. Off. . |

OTHER PUBLICATIONS

Mischa Schwartz, William Bennett and Seymour Stein, "Communication Systems and Techniques", pp. 459–466, McGraw–Hill, 1966.

*Primary Examiner*—Reinhard J. Eisenzopf
*Assistant Examiner*—Lee Nguyen
*Attorney, Agent, or Firm*—Oblon, Spivak, McClelland, Maier, & Neustadt, P.C.

[57] ABSTRACT

A base station and a mobile station in a mobile communication system capable of reducing interference among mobile stations and increasing a subscriber capacity of the system. The base station has a unit for measuring a measurement value for at least one of a receiving level and an interference ratio level of the mobile station transmission signals, and a unit for producing a mobile station transmission power control data specifying a mobile station transmission power required in adjusting the measurement value to a target level according to a number of base stations simultaneously in communication with the mobile station. The mobile station has a unit for measuring a measurement value for at least one of a receiving level and an interference ratio level of the base station transmission signals, and a unit for producing a base station transmission power control data specifying a base station transmission power required in adjusting the measurement value to a target level according to a number of base stations simultaneously in communication with the mobile station.

26 Claims, 6 Drawing Sheets

| VALUE SPECIFIED FROM BASE STATION | POWER CONTROL VALUE [dB] |
|---|---|
| 1011 | −5 |
| 1100 | −4 |
| 1101 | −3 |
| 1110 | −2 |
| 1111 | −1 |
| 0000 | 0 |
| 0001 | 1 |
| 0010 | 2 |
| 0011 | 3 |
| 0100 | 4 |
| 0101 | 5 |

BASE STATION DEVICE AND MOBILE STATION DEVICE IN MOBILE COMMUNICATION SYSTEM UTILIZING THE SITE DIVERSITY EFFECT IN SOFT HANDOVER STATE

BACKGROUND OF THE INVENTION

1. Field of the Invention

The present invention relates to a base station and a mobile station to be used in a mobile communication system.

2. Description of the Background Art

First, the conventional mobile communication system will be briefly described for a case of a CDMA (Code Division Multiple Access) scheme. In the CDMA mobile communication scheme, in order to alleviate the so called Near/Far problem related to the variation of distances from the base station to the mobile stations, the base station carries out the transmission power control with respect to the mobile station in communication such that the radio wave from all the mobile stations can be received at a uniform receiving level at the base station. Here, all the mobile stations carry out the communications at the same frequency so that the communications of the mobile stations interfere with each other and the communication quality is determined by this interference. However, in order to increase the subscriber capacity, the transmission power from the base station is set to be the least possible power for guaranteeing such a quality that the radio wave for the particular mobile station does not interfere with the other mobile stations. See, E. Kudoh and T. Matsumoto: "Effect of Transmitter Power Control Imperfections on Capacity in DS/CDMA Cellular Mobile Radios", IEEE ICC '92, pp. 310.1.1–310.1.6, for further detail.

In the CDMA mobile communication scheme, the radio channels are formed by using the same frequency and the different spread codes, so that when the mobile station moves to another cell (zone), the radio channel can be switched by changing the spread code without changing the frequency. Also, when the mobile station is capable of executing a received baseband signal processing using a plurality of correlators, it is also possible to set up a plurality of radio channels with respect to a plurality of base stations by using different spread codes. By utilizing this function at a time of the radio channel switching, it is possible to carry out the simultaneous communications with the base station to move in and the base station to move out so as to prevent the breaking of the communication at a time of the radio channel switching, which contributes to the improvement of the communication quality and the service in general. This operation is known as the soft handover.

Figure 1:
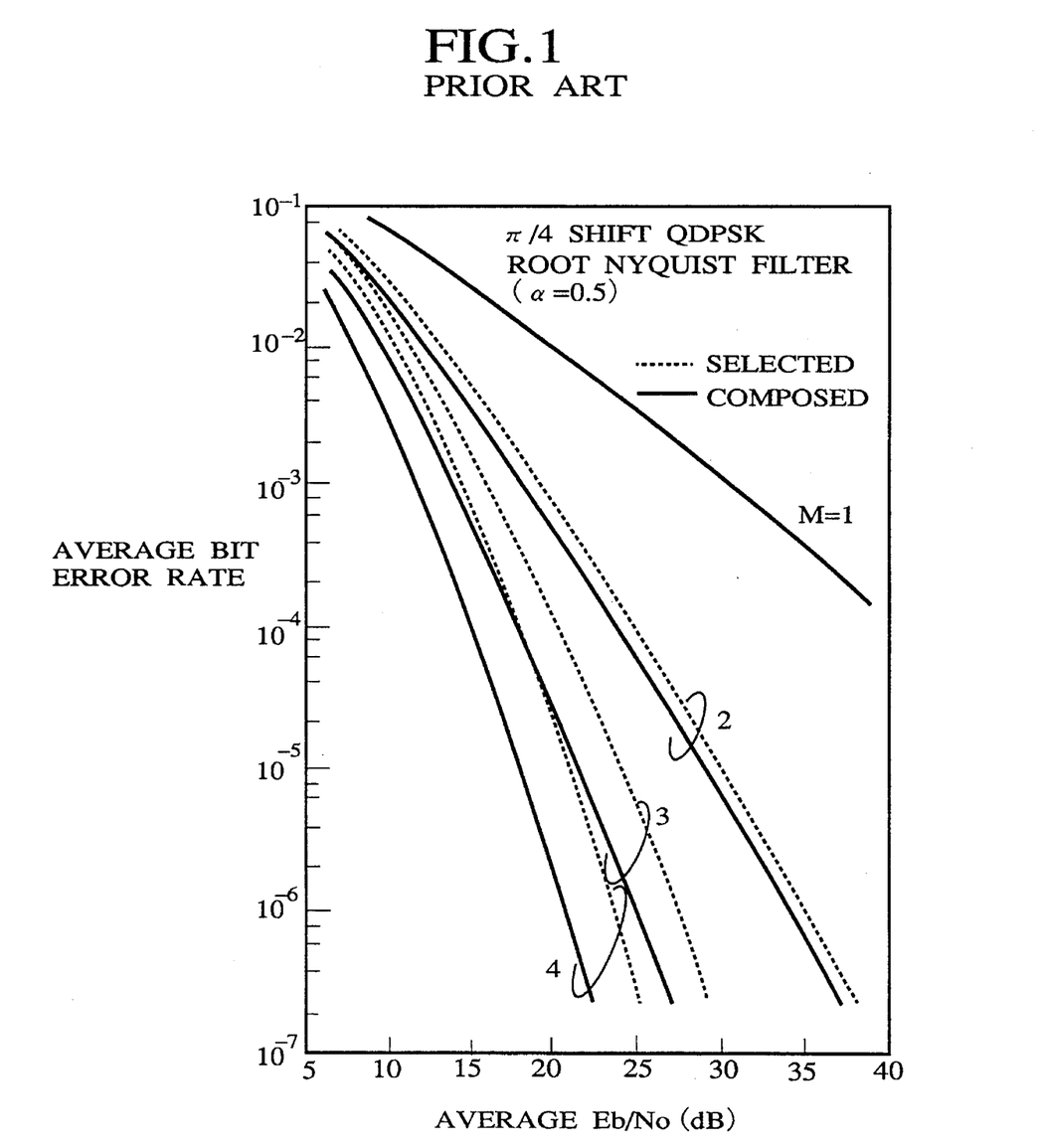
FIG. 1 is a graph of an average bit error rate versus an average Eb/No showing the diversity effect.

In the soft handover state, the mobile station is going to transmit the same data through a plurality of radio channels to different base stations simultaneously, so that the site diversity effect can be expected. By this diversity effect, the bit error rate characteristic can be improved as the number of branches M increases, as indicated in FIG. 1. See, M. Schwartz, et al.: "Communication Systems and Techniques", pp. 459–466, MaGraw-Hill, 1966 for the detailed information related to the indication of FIG. 1.

Thus, when the mobile station is in the soft handover state, the communication quality in each radio channel is degraded, but there are cases in which the sufficient characteristic can be obtained for the overall characteristic after the composition of a plurality of radio channels because of the site diversity effect.

However, in the conventional mobile communication scheme, when there are two base stations to communicate with, the target receiving level or the target interference ratio level to reach to both of the base stations at a time of the transmission power control is set to be identical as in a case of the communication through the single radio channel. Consequently, despite the fact that the overall quality after the composition is satisfying the threshold communication quality, the transmission power control at the same target level is carried out, so that the interference with the communications of the other mobile stations increases and the system capacity decreases.

In addition, in this soft handover, a number of transmission channels in communication between the base stations and the mobile stations increases by one radio channel, so that the transmission power must be increased for one transmission channel part. This implies that the interference with the communications of the other mobile stations is increased for one transmission channel part. For this reason, the interference with the communications of the other mobile stations increases and the system capacity decreases.

Furthermore, as the conditions for triggering the switching of the mobile station to the other base station, the threshold bit error rate and the threshold receiving level are used, but in the conventional mobile communication scheme, these conditions are maintained to be constant no matter how many base stations are to be connected. In other words, when a plurality of base stations are in communication, despite the fact that the overall quality after the composition is satisfying the threshold communication quality due to the site diversity effect, the radio channel switching is going to be carried out, so that the number of radio channel switching operations increases, and the control load on the base station and the mobile station increases.

Thus, the subscriber capacity of the system as a whole can be reduced when the target receiving level, the target interference ratio level, or the threshold communication quality for triggering the channel switching is set to be the same for both a case of communicating with only one base station and a case of communicating with a plurality of base stations as in the soft handover.

SUMMARY OF THE INVENTION

It is therefore an object of the present invention to provide a base station and a mobile station in a mobile communication system capable of reducing interference among mobile stations and increasing a subscriber capacity of the system by taking a full advantage of the site diversity effect in the soft handover state.

According to one aspect of the present invention there is provided a base station in a mobile communication system, comprising: means for receiving mobile station transmission signals from one mobile station in the mobile communication system; means for measuring a measurement value for at least one of a receiving level and an interference ratio level of the mobile station transmission signals; means for producing a mobile station transmission power control data specifying a mobile station transmission power required in adjusting the measurement value to a target level according to a number of base stations simultaneously in communication with said one mobile station; and means for transmitting base station transmission signals containing the mobile station transmission power control data to said one mobile station.

According to another aspect of the present invention there is provided a mobile station in a mobile communication system, comprising: means for receiving base station transmission signals from one base station in the mobile communication system; means for measuring a measurement value for at least one of a receiving level and an interference ratio level of the base station transmission signals; means for producing a base station transmission power control data specifying a base station transmission power required in adjusting the measurement value to a target level according to a number of base stations simultaneously in communication with said mobile station; and means for transmitting mobile station transmission signals containing the base station transmission power control data to said one base station.

According to another aspect of the present invention there is provided a mobile station in a mobile communication system, comprising: means for receiving base station transmission signals from one base station in the mobile communication system and transmitting mobile station transmission signals to base stations in the mobile communication system; means for measuring a communication quality of the base station transmission signals; means for carrying out a radio channel switching from said one base station to another base station in the mobile communication system whenever the communication quality measured by the measuring means becomes lower than a threshold communication quality; and means for adjusting the threshold communication quality according to a number of base stations simultaneously in communication with said mobile station.

According to another aspect of the present invention there is provided a method for controlling a transmission power in a mobile communication system, comprising the steps of: measuring a measurement value for at least one of a receiving level and an interference ratio level of mobile station transmission signals from one mobile station received at one base station; producing a mobile station transmission power control data specifying a mobile station transmission power required in adjusting the measurement value to a target level according to a number of base stations simultaneously in communication with said one mobile station; transmitting base station transmission signals containing the mobile station transmission power control data from said one base station to said one mobile station; extracting the mobile station transmission power control data from the base station transmission signals transmitted by said one base station and received at said one mobile station; and adjusting the mobile station transmission power of the mobile station transmission signals from said one mobile station to said one base station according to the mobile station transmission power control data.

According to another aspect of the present invention there is provided a method for controlling a transmission power in a mobile communication system, comprising the steps of: measuring a measurement value for at least one of a receiving level and an interference ratio level of base station transmission signals from one base station received at one mobile station; producing a base station transmission power control data specifying a base station transmission power required in adjusting the measurement value to a target level according to a number of base stations simultaneously in communication with said one mobile station; transmitting mobile station transmission signals containing the base station transmission power control data from said one mobile station to said one base station; extracting the base station transmission power control data from the mobile station transmission signals transmitted by said one mobile station and received at said one base station; and adjusting the base station transmission power of the base station transmission signals from said one base station to said one mobile station according to the base station transmission power control data.

According to another aspect of the present invention there is provided a method for controlling a radio channel switching of a mobile station in a mobile communication system, comprising the steps of: measuring a communication quality of the base station transmission signals from one base station received at said mobile station; carrying out a radio channel switching from said one base station to another base station in the mobile communication system whenever the communication quality measured at the measuring step becomes lower than a threshold communication quality; and adjusting the threshold communication quality according to a number of base stations simultaneously in communication with said mobile station.

Other features and advantages of the present invention will become apparent from the following description taken in conjunction with the accompanying drawings.

DETAILED DESCRIPTION OF THE PREFERRED EMBODIMENTS

Now, one embodiment of a mobile communication system according to the present invention will be described, for an exemplary case of using the CDMA mobile communication scheme.

Figure 2:
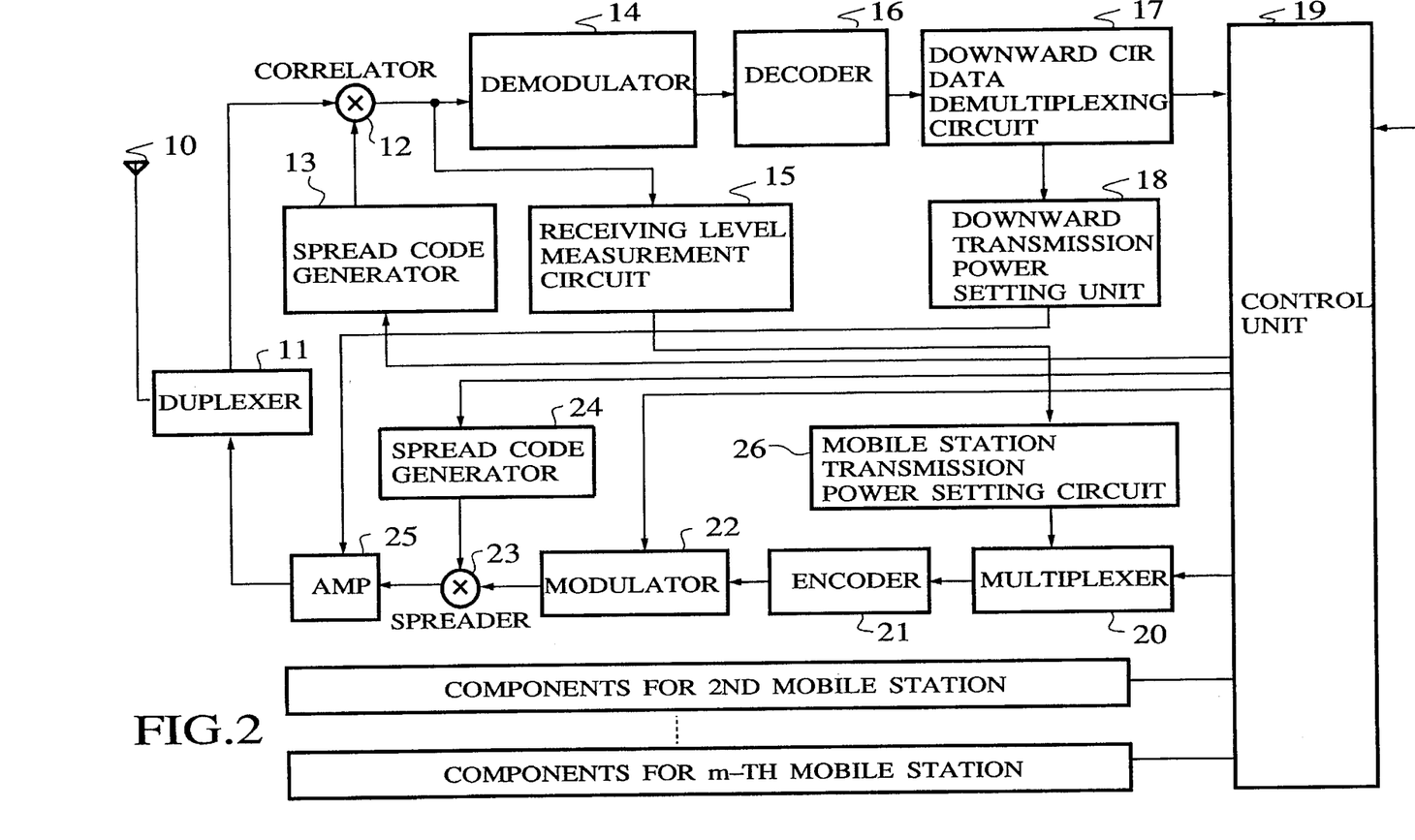
FIG. 2 is a block diagram of a base station in one embodiment of a mobile communication system according to the present invention.
Figure 3:
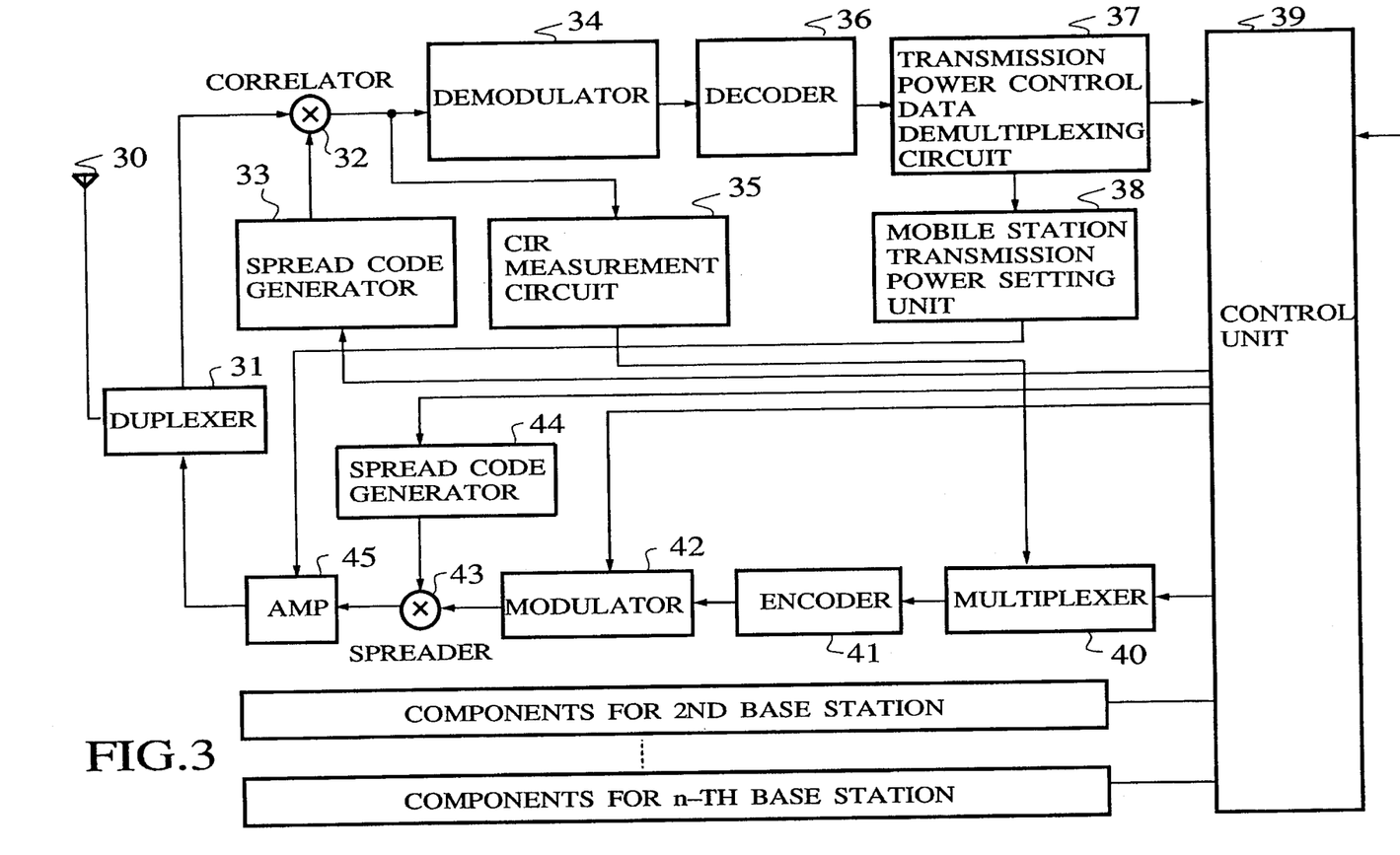
FIG. 3 is a block diagram of a mobile station in one embodiment of a mobile communication system according to the present invention.

In this embodiment, each base station has a device configuration as shown in FIG. 2 while each mobile station has a device configuration as shown in FIG. 3.

In the base station of FIG. 2, an antenna 10 for transmitting and receiving the RF (radio frequency) signals is connected with a duplexer 11 such that the mobile station transmission radio wave received by this antenna 10 is supplied to a correlator 12, while an output of a transmission side amplifier (AMP) 25 is supplied to this antenna 10. The received signal supplied from the duplexer 11 is then despread at the correlator 12 using the spread code given by a spread code generator 13, so as to make a correlation.

Here, the spread code generator 13 supplies the spread code specified by a control unit 19 to the the correlator 12. The output of the correlator 12 is then demodulated by a demodulator 14, while also supplied to a receiving level measurement circuit 15 for measuring the receiving level. The output of the demodulator 14 is decoded by the decoder 16, and from the output of this decoder 16, a received CIR (Carrier Interference Ratio) data is demultiplexed as a transmission power correction signal by a downward CIR data demultiplexing circuit 17 and supplied to a downward transmission power setting unit 18, while the remaining decoder output is supplied to the control unit 19. The downward transmission power setting unit 18 then sets up the base station transmission power, i.e., the output of the amplifier 25, according to the supplied downward CIR data.

The control unit 19 controls the operations such as those of transmission and reception of the communication signals and the soft handover, as the signals related to these operations are demultiplexed from the upward user data such as the speech data and multiplexing into the downward user data. The control unit 19 also carries out the other control operations such as an operation to specify the spread code to be generated by the spread code generators 13 and 24.

The downward signals from the control unit 19 are multiplexed at a multiplexer 20 with a mobile station transmission power data as a transmission power correction signal from a mobile station transmission power setting circuit 26. The output of the multiplexer 20 is encoded by an encoder 21, and the carrier supplied from the control unit 19 is modulated by the encoder output at the modulator 22. The output of the modulator 22 is multiplied by the spread code generated by the spread code generator 24 at a spreader 23 to make a spectrum spreading. Then, the output of the spreader 23 is amplified by the amplifier 25 and supplied to the duplexer 11. Here, the mobile station transmission power setting circuit 26 determines the setting value of the mobile station transmission power corresponding to the receiving level supplied from the receiving level measurement circuit 15, and supplies the determined setting value to the multiplexer 20.

The base station has a plurality of configurations similar to that described above for each one of a plurality of mobile stations, or for the soft handover.

On the other hand, in the mobile station of FIG. 3, an antenna 30 for transmitting and receiving the RF (radio frequency) signals is connected with a duplexer 31 such that the base station transmission radio wave received by this antenna 30 is supplied to a reception side correlator 32, while an output of a transmission side amplifier (AMP) 45 is supplied to this antenna 30. The received signal supplied from the duplexer 31 is then despread at the correlator 32 using the spread code given by a spread code generator 33, so as to make a correlation. Here, the spread code generator 33 supplies the spread code specified by a control unit 39 to the the correlator 32. The output of the correlator 32 is then demodulated by a demodulator 34, while also supplied to a CIR measurement circuit 35 for measuring the CIR. The output of the demodulator 34 is decoded by the decoder 36, and from the output of this decoder 36, a received mobile station transmission power control data specified from the base station is demultiplexed as a transmission power correction signal by a transmission power control data demultiplexing circuit 37 and supplied to a mobile station transmission power setting unit 38, while the remaining decoder output is supplied to the control unit 39. The mobile station transmission power setting unit 38 then sets up the mobile station transmission power, i.e., the output of the amplifier 45, according to the supplied mobile station transmission power control data.

The control unit 39 controls the operations such as those of transmission and reception of the communication signals and the soft handover, as the signals related to these operations are demultiplexed from the downward user data such as the speech data and multiplexing into the upward user data. The control unit 39 also carries out the other control operations such as an operation to specify the spread code to be generated by the spread code generators 33 and 44.

The upward signals from the control unit 39 are multiplexed at a multiplexer 40 with a CIR value as a transmission power correction signal measured by the measurement circuit 35. The output of the multiplexer 40 is encoded by an encoder 41, and the carrier supplied from the control unit 39 is modulated by the encoder output at the modulator 42. The output of the modulator 42 is multiplied by the spread code generated by the spread code generator 44 at a spreader 43 to make a spectrum spreading. Then, the output of the spreader 43 is amplified by the amplifier 45 and supplied to the duplexer 31.

The mobile station has a plurality of configurations similar to that described above for each one of a plurality of base stations such that it is possible to communicate with a plurality of base stations simultaneously.

The mobile station is constantly monitoring the receiving level or the communication quality of the signals from the base stations currently not communicating with, and sets up a connection with a base station for which the monitored receiving level or the communication quality reached a prescribed threshold. Thus, while in communication, a number of connected base stations varies in time due to the influence of the fading or the movement of the mobile station, and the mobile station corrects its transmission power according to a variation of the number of connected base stations. To this end, the target level (the target receiving level or the target interference ratio level) of the upward and downward transmission power control is changed according to the number of connected base stations which receive the identical signals.

Figure 4:
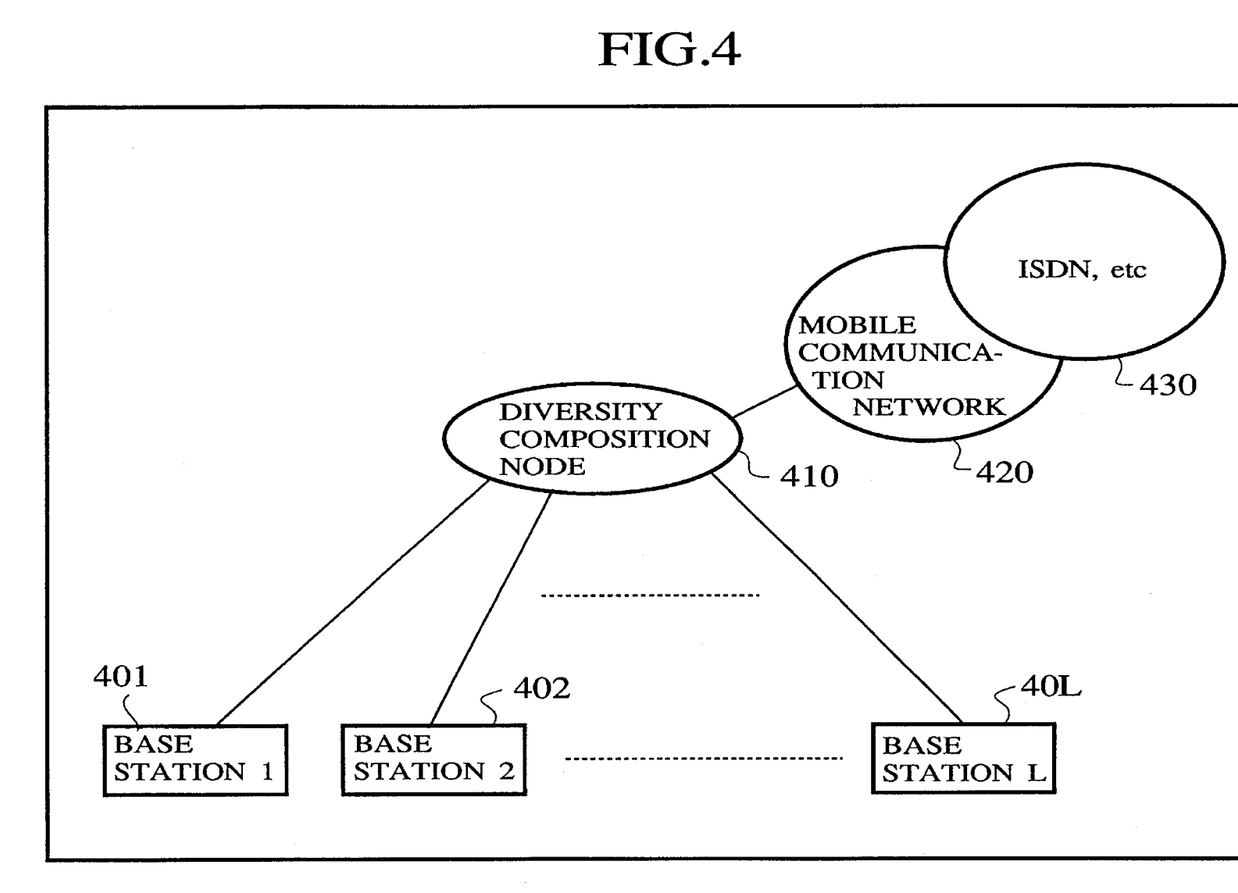
FIG. 4 is a schematic block diagram for explaining a diversity composition of the upward user data at a diversity composition in one embodiment of the mobile communication system according to the present invention.

Here, while the mobile station is in communication with a plurality of base stations, the upward user data are handled as shown in FIG. 4 in which the received signals from each one of the base stations 401 to 40L connected with one and the same mobile station are transmitted to one and the same subscriber by being composed with the others by a switch in a middle, i.e., applied with a diversity composition at a diversity composition node 410 of the network, and outputted through the mobile communication network 420 to the ISDN (Integrated Service Digital Network) 480 etc.

Figure 5:
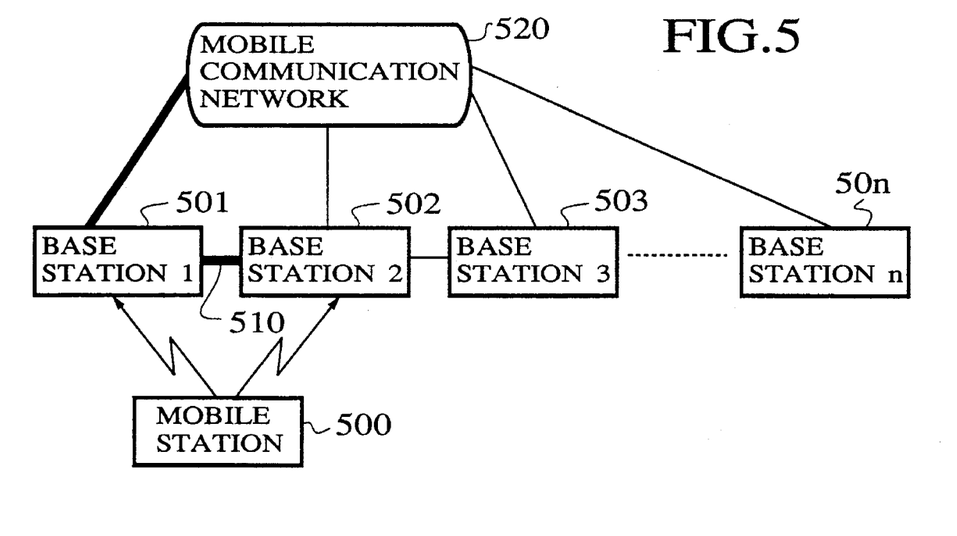
FIG. 5 is a schematic diagram for explaining a diversity composition of the upward user data at a base station in one embodiment of the mobile communication system according to the present invention.

On the other hand, the downward user data transmitted through different radio channels from a plurality of base stations connected with one and the same mobile station are applied with the diversity composition at the control unit 39 at the mobile station of FIG. 8. Alternatively, as shown in FIG. 5, when the state of the mobile station 500 changes from that in which it is connected only with one base station 501 to that of the soft handover in which it is connected with both base stations 501 and 502, the upward and downward signals between the mobile station 500 and the base station 502 are led to the base station 501 through a wire transmission line 510 between the base stations 501 and 502, such that the upward signals to the base station 501 and the upward signals to the base station 502 are applied with the diversity composition at the base station 501 and transmitted to the mobile communication network 520 while the downward signals from the mobile communication network 520 are divided into those to be directly transmitted from the base station 501 and those to be transmitted from the base station 502, which are applied with the diversity composition at the mobile station 500. In other words, in the soft handover state, the base station to be newly connected is connected with the mobile communication network through the base station which has already been connected before the soft handover. In this manner, in a case of the soft handover, the upward signals are applied with the diversity composition at the higher level class network node or the base station.

Now, the transmission power control in this embodiment will be described in detail.

First, the upward transmission power control is carried out as follows.

At the base station, the received mobile station transmission radio wave is despread by the correlator 12, and then its receiving level is measured by the receiving level measurement circuit 15 and reported to the mobile station transmission power setting circuit 26. Here, various manners for the transmission power control are possible, but the essential function of adjusting to the target receiving level or interference ratio level is common, so that a manner of increasing or decreasing the current mobile station transmission power value by a specified transmission power value will be described as an example. In particular, an exemplary case of using the receiving level for realizing the target bit error rate as the target receiving level will be described.

In this case, the mobile station transmission power setting circuit 26 supplies to the multiplexer 20 the transmission power correction signal, i.e., the data for controlling the mobile station transmission power for realizing the target receiving level, according to the measured receiving level. For example, when the target bit error rate is set to be $10^{-3}$, the transmission power of the mobile station is controlled such that the target level, i.e., Eb/No of the base station reception becomes 30 dB when there is only one connected base station, or 20 dB when there are two connected base stations, according to FIG. 1 described above.

Figure 6:
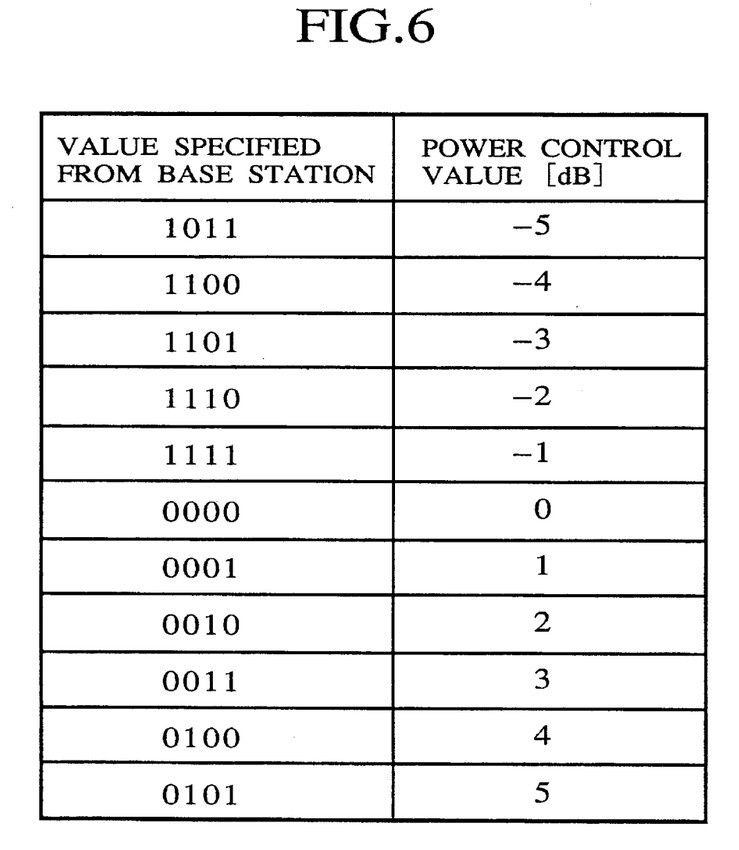
FIG. 6 is a diagrammatic illustration of a table provided in a mobile station transmission power setting circuit in the base station of FIG. 2.

Here, the mobile station transmission power setting circuit 26 is provided with a table as shown in FIG. 6 according to which the transmission power correction signal to be supplied to the multiplexer 20 is determined as "0000" for a case of maintaining the current mobile station transmission power, "0010" for a case of increasing the current mobile station transmission power by 2 dB, etc. The output of the multiplexer 20 is subsequently transmitted to the mobile station through the encoder 21, the modulator 22, the spreader 23, the amplifier 25, the duplexer 11, and the antenna 10.

At the mobile station, the transmission power correction signal, i.e., the upward transmission power setting data transmitted from the base station, is extracted at the transmission power control data demultiplexing circuit 37, and supplied to the mobile station transmission power setting unit 38. This mobile station transmission power setting unit 38 is provided with a table identical to that of FIG. 6, and controls the output of the amplifier 45 according to this table of FIG. 6. In this manner, the transmission power of the mobile station is controlled as specified from the base station, to realize the different target receiving level depending on a number of connected base stations.

Here, in a case the number of connected base stations for one and the same mobile station is more than one, this fact is notified to each base station by the diversity node in FIG. 4 or the wire transmission line from the base station which has already been connected before the soft handover. The mobile station automatically knows the number of simultaneously connected base stations as the connections with the base stations are determined by the mobile station itself.

Next, the downward transmission power control is carried out as follows.

At the mobile station, the received base station transmission radio wave is despread by the correlator 32, and then its CIR is measured by the CIR measurement circuit 35. The measured CIR value is then transmitted to the multiplexer 40 as the transmission power correction signal, and transmitted to the base station through the encoder 41, the modulator 42, the spreader 43, the amplifier 45, the duplexer 31, and the antenna 30.

At the base station, the downward CIR measurement value transmitted from the mobile station is extracted at the downward CIR data demultiplexing circuit 17, and supplied to the downward transmission power setting unit 18. This downward transmission power setting unit 18 then controls the output of the amplifier 25 according to the downward CIR measurement value and the interference ratio level for realizing the target bit error rate. For example, when the target bit error rate is set to be $10^{-3}$, the transmission power of the base station is controlled such that the predicted Eb/No of the mobile station reception becomes 30 dB when there is only one connected base station, or 20 dB when there are two connected base stations, according to FIG. 1 described above.

Figure 7A:
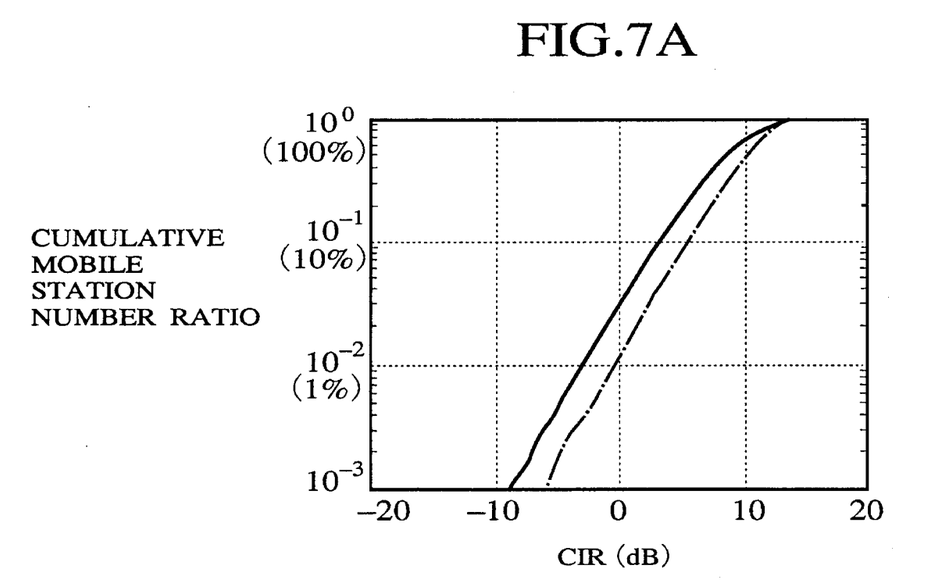
FIGS. 7A and 7B are graphs of a cumulative distribution of a CIR for the upward communication and the downward communication, respectively, in one embodiment of the mobile communication system according to the present invention.

FIG. 7A shows a characteristic of the upward communication when the target receiving level at the base station is decreased as much as the site diversity gain part in a case of the mobile station is making the simultaneous communications with two base stations, compared with a case of making a communication through only one radio channel. Here, the characteristic is evaluated by the cumulative CIR distribution of the mobile station within cell (zone) area with respect to the base station reception CIR. Namely, the vertical axis represents a ratio of the mobile stations which have the CIR not greater than the CIR indicated on the horizontal axis. The result shown here is for a case in which the mobile stations are uniformly distributed within the area and the site diversity gain part and the decrease of the target receiving level are specified in units of 5 dB. In FIG. 7A, the solid line indicates a case in which the target receiving level is not changed regardless of the number of base stations in communication, while the one dot chain line indicates a case in which the target receiving level is changed according to the number of base stations in communication. As should be apparent from FIG. 7A, the ratio of the mobile stations with the CIR not greater than 5 dB is about 18% in a case of not changing the target receiving level, whereas it is only about 7% in a case of changing the target receiving level according to the present invention, so that there is an improvement effect of $(18-7)/18 \approx 61\%$.

Figure 7B:
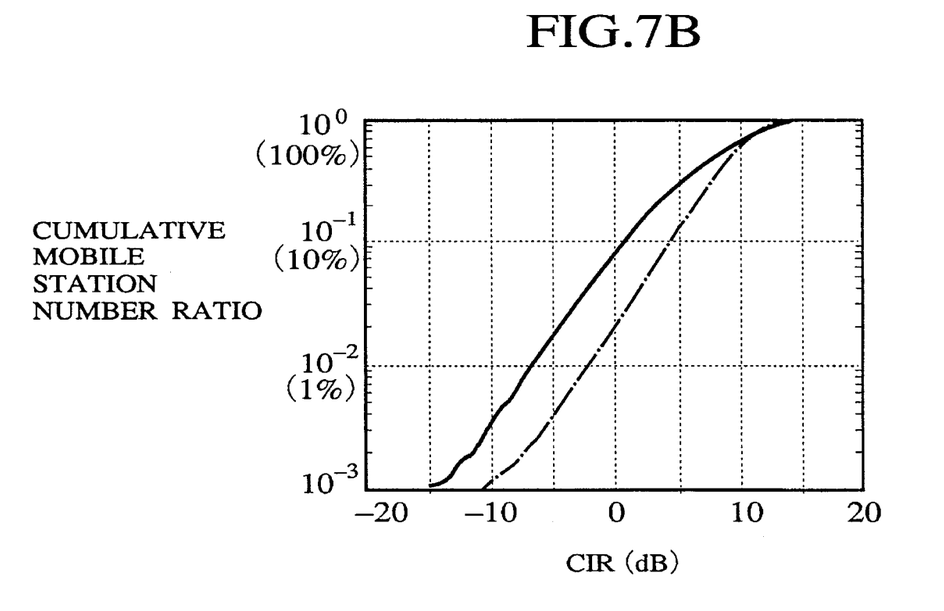

FIG. 7B shows a characteristic of the downward communication when the target interference ratio level is decreased in a case of the mobile station is making the simultaneous communications with two base stations, compared with a case of making a communication through only one radio channel. Just as in FIG. 7A, the characteristic is evaluated by the cumulative CIR distribution of the mobile station within cell (zone) area with respect to the base station reception CIR. Namely, the vertical axis represents a ratio of the mobile stations which have the CIR not greater than the CIR indicated on the horizontal axis. The result shown here is for a case in which the mobile stations are uniformly distributed within the area and the site #diversity gain part and the decrease of the target interference ratio level are specified in units of 5 dB. In FIG. 7B, the solid line indicates a case in which the target interference ratio level is not changed regardless of the number of base stations in communication, while the one dot chain line indicates a case in which the target interference ratio level is changed according to the number of base stations in communication. As should be apparent from FIG. 7B, the ratio of the mobile stations with the CIR not greater than 5 dB is about 25% in a case of not changing the target receiving level, whereas it is only about 12% in a case of changing the target receiving level according to the present invention, so that there is an improvement effect of (25−12)/25≈52%.

In the above, the target level has been changed according to the number of base stations simultaneously in communication with the same mobile station when the transmission power correction signal is produced at the mobile station transmission power setting circuit 26 by measuring the receiving level at the base station of the radio wave from the mobile station, but it is also possible to modify this scheme such that the target level is maintained as constant and the same transmission power correction signal is transmitted to the mobile station, while the transmission power correction signal demultiplexed at the demultiplexer 37 is corrected at the mobile station according to the number of base stations simultaneously in communication with this mobile station, so as to sets the output of the amplifier 45 to be lower by 10 dB in a case the number of base stations simultaneously in communication is greater than or equal to two, in the above described example.

Moreover, in the above, the transmission power correction signal, i.e., the CIR measurement value received from the mobile station, is corrected by changing the target level according to the number of simultaneously connected base after it is demultiplexed at the demultiplexer 17 of the base station, but it is also possible to carry out this correction at the mobile station side. Namely, the CIR measurement value measured by the CIR measurement circuit 35 of the mobile station is corrected according to the number of simultaneously connected base stations and then supplied to the multiplexer 40. For example, when the number of simultaneously connected base stations is 2, the CIR measurement value is corrected by adding 10 dB.

In either case, it is also possible to transmit just the correction value for realizing the base station transmission power at the target level obtained according to the CIR measurement value, from the mobile station to the base station. In other words, the operation similar to that done by the mobile station transmission power setting circuit 26 in the base station can also be carried out at the mobile station side as well. On the contrary, it is also possible to enter the receiving level measured by the receiving level measurement circuit 15 directly into the multiplexer 20 at the base station side so as to transmit the measured receiving level directly from the base station to the mobile station, and to control the amplifier 45 on the mobile station side to make the transmission power correction signal given by the receiving level measurement value demultiplexed by the demultiplexer 37 to be at the target level. It is also possible to carry out the receiving level measurement at the mobile station side instead of the CIR measurement and to carry out the CIR measurement at the base station side instead of the receiving level measurement, or to carry out only either one of the receiving level measurement and the CIR measurement at both the base station side and the mobile station side.

Furthermore, in the above, the target level itself is directly corrected, but it is also possible to fix the target level and to correct the correction signal based on the difference between the fixed target level and the measurement level by an appropriate amount according to the number of base stations receiving the same signal, so as to achieve the equivalent effect as the correction of the target level.

Next, the operation for setting the threshold communication quality for triggering the switching operation of the soft handover at the mobile station according to the number of base stations in communication will be described. Here, the triggering threshold communication quality is set to a lower value compared with the setting of the bit error rate used for the target receiving level or the target interference ratio level. Then, the soft handover is going to be carried out by the control unit 39 of the mobile station whenever the communication quality becomes lower than that threshold, but here the bit error rate improves as the number of base stations simultaneously in communication increases, i.e., as the switching branch number M in FIG. 1 described above increases, so that the setting of the triggering threshold communication quality is going to be changed according to the number of base stations simultaneously in communication.

For example, when the triggering threshold communication quality is originally set to realize the bit error rate of $3 \times 10^{-3}$, according to the FIG. 1 described above, the Eb/No is 25 dB for only one base station simultaneously in communication, whereas the Eb/No is 16 dB for two base stations simultaneously in communication. Consequently, in a case the number of base stations simultaneously in communication is 2, the triggering threshold communication quality of the receiving level or the interference ratio level can be changed for each radio channel to realize the Eb/No which is 9 dB lower than a case of only one base station simultaneously in communication. In this manner, the soft handover is carried out less frequently while the mobile station is communicating with a plurality of base stations simultaneously, so that the number of occupied communication transmission channels can be reduced, and as a consequence, the interference-with the communications of the other mobile stations can be reduced and the subscriber capacity of the system as a whole can be increased.

It is to be noted that the present invention is equally applicable to the TDMA (time division multiple access) mobile communication scheme in substantially similar manner as in a case of the CDMA mobile communication scheme described above.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A base station in a mobile communication system, comprising:

means for receiving mobile station transmission signals from one mobile station in the mobile communication system;

means for measuring a measurement value for at least one of a receiving level and an interference ratio level of the mobile station transmission signals;

means for producing a mobile station transmission power control data specifying a mobile station transmission power required in adjusting the measurement value to a target level according to a number of base stations simultaneously in communication with said one mobile station; and means for transmitting base station transmission signals containing the mobile station transmission power control data to said one mobile station.

2. The base station of claim 1, wherein the producing means changes the target level lower for a larger number of base stations simultaneously in communication with said one mobile station.

3. The base station of claim 1, wherein the producing means changes the mobile station transmission power control data to a higher level when the number of base stations simultaneously in communication with said one mobile station is decreased, and changes the mobile station transmission power control data to a lower level when the number of base stations simultaneously in communication with said one mobile station is increased.

4. The base station of claim 1, further comprising:

means for extracting a base station transmission power control data specifying a required base station transmission power from the mobile station transmission signals; and means for adjusting the base station transmission power of the base station transmission signals according to the base station transmission power control data.

5. The base station of claim 4, wherein the base station transmission power control data indicates a measured value of at least one of a receiving level and an interference ratio level of the base station transmission signals received at said one mobile station, and the adjusting means adjusts the base station transmission power as predicted to be required in adjusting the measured value to a target value according to a number of base stations simultaneously in communication with said one mobile station.

6. The base station of claim 5, wherein the adjusting means changes the target value lower for a larger number of base stations simultaneously in communication with said one mobile station.

7. A mobile station in a mobile communication system, comprising:

means for receiving base station transmission signals from one base station in the mobile communication system;

means for measuring a measurement value for at least one of a receiving level and an interference ratio level of the base station transmission signals;

means for producing a base station transmission power control data specifying a base station transmission power required in adjusting the measurement value to a target level according to a number of base stations simultaneously in communication with said mobile station; and means for transmitting mobile station transmission signals containing the base station transmission power control data to said one base station.

8. The mobile station of claim 7, wherein the producing means changes the target level lower for a larger number of base stations simultaneously in communication with said mobile station.

9. The mobile station of claim 7, wherein the producing means changes the base station transmission power control data to a higher level when the number of base stations simultaneously in communication with said mobile station is decreased, and changes the base station transmission power control data to a lower level when the number of base stations simultaneously in communication with said mobile station is increased.

10. The mobile station of claim 7, further comprising:

means for extracting a mobile station transmission power control data specifying a required mobile station transmission power from the base station transmission signals; and means for adjusting the mobile station transmission power of the mobile station transmission signals according to the mobile station transmission power control data.

11. The mobile station of claim 10, wherein the mobile station transmission power control data indicates a measured value of at least one of a receiving level and an interference ratio level of the mobile station transmission signals received at said one base station, and the adjusting means adjusts the mobile station transmission power as predicted to be required in adjusting the measured value to a target value according to a number of base stations simultaneously in communication with said mobile station.

12. The mobile station of claim 11, wherein the adjusting means changes the target value lower for a larger number of base stations simultaneously in communication with said mobile station.

13. A mobile station in a mobile communication system, comprising:

means for receiving base station transmission signals from one base station in the mobile communication system and transmitting mobile station transmission signals to base stations in the mobile communication system;

means for measuring a communication quality of the base station transmission signals;

means for carrying out a radio channel switching from said one base station to another base station in the mobile communication system whenever the communication quality measured by the measuring means becomes lower than a threshold communication quality; and means for adjusting the threshold communication quality according to a number of base stations simultaneously in communication with said mobile station.

14. The mobile station of claim 13, wherein the adjusting means changes the threshold communication quality lower for a larger number of base stations simultaneously in communication with said mobile station.

15. A method for controlling a transmission power in a mobile communication system, comprising the steps of:

measuring a measurement value for at least one of a receiving level and an interference ratio level of mobile station transmission signals from one mobile station received at one base station;

producing a mobile station transmission power control data specifying a mobile station transmission power required in adjusting the measurement value to a target level according to a number of base stations simultaneously in communication with said one mobile station;

transmitting base station transmission signals containing the mobile station transmission power control data from said one base station to said one mobile station;

extracting the mobile station transmission power control data from the base station transmission signals transmitted by said one base station and received at said one mobile station; and adjusting the mobile station transmission power of the mobile station transmission signals from said one mobile station to said one base station according to the mobile station transmission power control data.

16. The method of claim 15, wherein the producing step changes the target level lower for a larger number of base stations simultaneously in communication with said one mobile station.

17. The method of claim 15, wherein the producing step changes the mobile station transmission power control data to a higher level when the number of base stations simultaneously in communication with said one mobile station is decreased, and changes the mobile station transmission power control data to a lower level when the number of base stations simultaneously in communication with said one mobile station is increased.

18. The method of claim 15, wherein the mobile station transmission power control data indicates a measured value of at least one of a receiving level and an interference ratio level of the mobile station transmission signals from said one mobile station received at said one base station, and the adjusting step adjusts the mobile station transmission power as predicted to be required in adjusting the measured value to a target value according to a number of base stations simultaneously in communication with said one mobile station.

19. The method of claim 18, wherein the adjusting step changes the target value lower for a larger number of base stations simultaneously in communication with said one mobile station.

20. A method for controlling a transmission power in a mobile communication system, comprising the steps of:

measuring a measurement value for at least one of a receiving level and an interference ratio level of base station transmission signals from one base station received at one mobile station;

producing a base station transmission power control data specifying a base station transmission power required in adjusting the measurement value to a target level according to a number of base stations simultaneously in communication with said one mobile station;

transmitting mobile station transmission signals containing the base station transmission power control data from said one mobile station to said one base station;

extracting the base station transmission power control data from the mobile station transmission signals transmitted by said one mobile station and received at said one base station; and adjusting the base station transmission power of the base station transmission signals from said one base station to said one mobile station according to the base station transmission power control data.

21. The method of claim 20, wherein the producing step changes the target level lower for a larger number of base stations simultaneously in communication with said one mobile station.

22. The method of claim 20, wherein the producing step changes the base station transmission power control data to a higher level when the number of base stations simultaneously in communication with said one mobile station is decreased, and changes the base station transmission power control data to a lower level when the number of base stations simultaneously in communication with said one mobile station is increased.

23. The method of claim 20, wherein the base station transmission power control data indicates a measured value of at least one of a receiving level and an interference ratio level of the base station transmission signals from said one base station received at said one mobile station, and the adjusting step adjusts the mobile station transmission power as predicted to be required in adjusting the measured value to a target value according to a number of base stations simultaneously in communication with said one mobile station.

24. The method of claim 23, wherein the adjusting step changes the target value lower for a larger number of base stations simultaneously in communication with said one mobile station.

25. A method for controlling a radio channel switching of a mobile station in a mobile communication system, comprising the steps of:

measuring a communication quality of the base station transmission signals from one base station received at said mobile station;

carrying out a radio channel switching from said one base station to another base station in the mobile communication system whenever the communication quality measured at the measuring step becomes lower than a threshold communication quality; and adjusting the threshold communication quality according to a number of base stations simultaneously in communication with said mobile station.

26. The method of claim 25, wherein the adjusting step changes the threshold communication quality lower for a larger number of base stations simultaneously in communication with said mobile station.

* * * * *